United States Patent
Skillermark et al.

(10) Patent No.: US 11,234,122 B2
(45) Date of Patent: Jan. 25, 2022

(54) PACKET FORWARDING IN A WIRELESS MESH NETWORK

(71) Applicant: Telefonaktiebolaget LM Ericsson (publ), Stockholm (SE)

(72) Inventors: Per Skillermark, Årsta (SE); Roman Chirikov, Stockholm (SE); Piergiuseppe Di Marco, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 76 days.

(21) Appl. No.: 16/316,663

(22) PCT Filed: Aug. 10, 2016

(86) PCT No.: PCT/SE2016/050745
§ 371 (c)(1),
(2) Date: Jan. 10, 2019

(87) PCT Pub. No.: WO2018/030923
PCT Pub. Date: Feb. 15, 2018

(65) Prior Publication Data
US 2019/0159022 A1 May 23, 2019

(51) Int. Cl.
*H04W 8/26* (2009.01)
*H04W 28/02* (2009.01)
(Continued)

(52) U.S. Cl.
CPC .............. *H04W 8/26* (2013.01); *H04W 4/80* (2018.02); *H04W 28/02* (2013.01);
(Continued)

(58) Field of Classification Search
CPC ........... H04W 56/001; H04W 72/0446; H04W 72/1263; H04W 4/80; H04W 28/02; H04W 8/26; H04W 84/18
See application file for complete search history.

(56) References Cited

U.S. PATENT DOCUMENTS 6,122,268 A * 9/2000 Okanoue ................. H04L 29/06
370/338
6,621,805 B1 * 9/2003 Kondylis ............ H04L 47/2416
370/329
(Continued)

FOREIGN PATENT DOCUMENTS

CA 3044071 A1 * 6/2018 ........... G06F 16/273
CA 3066903 A1 * 1/2019 ........... H04L 9/0869
(Continued)

OTHER PUBLICATIONS

Supplementary European Search Report and Written Opinion, EP 16 912 806.3, dated Jun. 6, 2019, 6 pages.
(Continued)

*Primary Examiner* — Mehmood B. Khan
(74) *Attorney, Agent, or Firm* — Sage Patent Group

(57) ABSTRACT

There is provided a method and corresponding arrangements and network nodes/devices for enabling packet forwarding in a wireless mesh network comprising a plurality of nodes. Basically, the method comprises conforming, for transmission of the same network layer information from at least two different nodes, the corresponding over-the-air packets to be node-independent, and scheduling the conformed over-the-air packets for synchronized and simultaneous transmission from the at least two different nodes.

14 Claims, 16 Drawing Sheets

(51) Int. Cl.
*H04W 4/80* (2018.01)
*H04W 56/00* (2009.01)
*H04W 72/04* (2009.01)
*H04W 72/12* (2009.01)
*H04W 84/18* (2009.01)

(52) U.S. Cl.
CPC ..... *H04W 56/001* (2013.01); *H04W 72/0446* (2013.01); *H04W 72/1263* (2013.01); *H04W 84/18* (2013.01)

(56) References Cited

U.S. PATENT DOCUMENTS

| | | | | |
|---|---|---|---|---|
| 6,721,290 | B1* | 4/2004 | Kondylis | H04L 12/1854 370/329 |
| 7,879,111 | B2* | 2/2011 | Hardacker | H04W 12/04 726/35 |
| 2003/0069981 | A1* | 4/2003 | Trovato | H04L 61/35 709/228 |
| 2007/0153809 | A1* | 7/2007 | Chang | H04L 12/185 370/395.53 |
| 2016/0050146 | A1* | 2/2016 | Henderson | H04L 67/1097 370/392 |
| 2016/0105788 | A1 | 4/2016 | Helms et al. | |
| 2016/0261615 | A1* | 9/2016 | Sonnenberg | H04L 41/12 |
| 2017/0019370 | A1* | 1/2017 | Ravinoothala | H04L 61/103 |
| 2017/0034160 | A1* | 2/2017 | Brands | H04W 12/04 |
| 2017/0118754 | A1* | 4/2017 | Kang | H04W 72/082 |
| 2017/0171698 | A1* | 6/2017 | Lan | H04L 61/2007 |
| 2017/0371499 | A1* | 12/2017 | Checkley | H04W 4/21 |
| 2019/0260706 | A1* | 8/2019 | Ravinoothala | G06F 9/45558 |

FOREIGN PATENT DOCUMENTS

| | | |
|---|---|---|
| EP | 2 999 297 A2 | 3/2016 |
| GB | 2512733 A | 10/2014 |
| WO | WO 2016/049223 A1 | 3/2016 |
| WO | WO-2016135726 A1 * 9/2016 ........... H04L 9/0656 |

OTHER PUBLICATIONS

Yin Wang, IEEE et al., Disco: Improving Packet Delivery via Deliberate Synchronized Construction Interference, IEEE Transactions on Parallel and Distributed Systems, vol. 26, No. 3, Mar. 2015, pp. 713-723.

International Search Report and Written Opinion of the International Searching Authority, PCT/SE2016/050745, dated Dec. 22, 2017, 10 pages.

Wang Yin et al., Disco: Improving Packet Delivery via Deliberate Synchronized Constructive Interference, IEEE Transactions on Parallel and Distributed Systems, vol. 26, No. 3, Mar. 1, 2015, pp. 713-723.

Wang Yin et al., Poster Abstract: Direct Multi-hop Time Synchronization with Constructive Interference, MOE Key Lab for Information System Security, School of Software, TNLIST, Tsinghua University, Science and technology on communication information security control laboratory, Institute of Software, Chinese Academy of Sciences, Apr. 16, 2012, pp. 115-116.

Federico Ferrari et al., Efficient Network Flooding and Time Synchronization with Glossy, ETH Zurich, Switzerland, IEEE Xplore, May 2011, 13 Pages.

* cited by examiner

PACKET FORWARDING IN A WIRELESS MESH NETWORK

CROSS REFERENCE TO RELATED APPLICATIONS

This application is a 35 U.S.C. § 371 national stage application of PCT International Application No. PCT/SE2016/050745 filed on Aug. 10, 2016, the disclosure and content of which is incorporated by reference herein in its entirety.

TECHNICAL FIELD

The proposed technology generally relates to wireless mesh networks and more specifically to a method of enabling packet forwarding in a wireless mesh network, an arrangement configured to enable packet forwarding in a wireless mesh network, a network node in a wireless mesh network, as well as a corresponding computer program and computer-program product, and an apparatus for enabling packet forwarding by a network node of a wireless mesh network, as well as a corresponding network device.

BACKGROUND

Mesh networking is a means to increase the effective communication range of wireless nodes and may further ease the deployment of nodes. In a wireless mesh network all nodes in the network can communicate with all other nodes; either by direct message exchange if within range or by making use of intermediate nodes that help passing the message along when direct communication is not possible. One message forwarding technique is routing, in which the message traverses a specific, optimized path through the network from the source to the intended destination. Another message forwarding technique is referred to as flooding. In flooding mesh networks all nodes that receive a message typically re-transmits the message to all or at least a subset of their neighbors. In this way the message reaches all or a desired subset of nodes in the network and hence eventually also the intended destination.

By way of example, Bluetooth Low Energy (BLE) networks may be implemented as a wireless mesh network using flooding based on broadcasting over a set of shared channels—the advertisement channels. A node acting as a relay in a BLE mesh network scans the advertisement channels for Mesh packets. When a packet is detected and received the node checks if it is the final destination of the packet—if yes, the packet content is sent to the application where it is processed. If the node is not the final destination of the packet the node checks if it has already received and forwarded the packet. If yes, the packet is discarded. If not, the packet is forwarded in the mesh network by re-transmitting it over the advertisement channels so that it can be received by the neighbors of the node. Typically, some random delay is introduced before forwarding the packet to avoid collisions. By means of this distributed mechanism the packet is forwarded from node to node(s) in the network until the packet arrives at the final destination.

In a BLE Mesh network all packets are transmitted over the advertisement channels using so-called non-connectable advertising protocol data units (PDUs), formally entitled ADV_NONCONN_IND. The advertising PDU contains a 16 bit header and payload. The payload of such an ADV_NONCONN_IND PDU contains the advertiser's device address, AdvA (6 B), and 0-31 B of advertising data, AdvData. The advertising is protected by a CRC, calculated over the advertising PDU, i.e., including both the AdvA and the AdvData fields.

FIG. 1 is a schematic diagram illustrating an example of a wireless mesh network. In this example, the wireless mesh network comprises seven nodes $n_0$ to $n_6$. Dashed lines illustrate which nodes that are neighbors and can communicate directly with each other. If node $n_0$ should send a packet to node $n_5$ the transmission from node $n_0$ will first reach the nodes $n_1$ and $n_2$. These nodes forward the packet such that it reaches node $n_3$, which in turn forwards it to node $n_4$, which forwards it to nodes $n_5$ and $n_6$. In this example, the packet has reached its destination within four hops.

In the basic case, the nodes act autonomously and schedule their respective transmissions independently of each other. Packet transmissions that overlap in time will interfere with each other and may cause decoding errors. In a mesh network, interference may even occur between transmissions that transmit the same content. For example, in FIG. 1, the transmissions of nodes $n_1$ and $n_2$, which both forward a packet received from node $n_0$, may overlap in time and interfere with each other. A possible consequence of this is that node $n_3$ never receives any packet. This is schematically illustrated in FIG. 2.

In the example of FIG. 2, the original message $m_0$ is transmitted from the original source node $n_0$ at time $t_1$. This transmission is completed at time $t_2$ and received by nodes $n_1$ and $n_2$. These nodes schedule the forwarding of the message at times $t_3$ and $t_4$. The respective transmissions are completed at times $t_5$ and $t_6$. This implies that during the time period $t_4$ to $t_5$ there are two transmissions on the air that interfere with each other at the receiver.

Even though the actual (application layer) content of the message is identical, the packet as seen over the air may not necessarily be identical. This is due to the fact that some protocol fields at, e.g., the network layer and the link layer may be adjusted depending on the hop and the node identity. By way of example, in the BLE Mesh standard proposal there is a Time-To-Live (TTL) counter field in the network layer that is decremented at every hop. When nodes $n_1$ and $n_2$ forward the packet received by node $n_0$ the TTL field has been decremented by one. Furthermore, the advertising address is always included in the payload of the advertising PDU. In FIG. 2 this is depicted by node $n_0$ sending a message $m_0$ and the nodes $n_1$ and $n_2$ forward slightly altered copies of this message, denoted $m_0'$ and $m_0''$, respectively, resulting in unwanted interference.

There is thus a general need for improvements to enable more efficient packet forwarding in wireless mesh networks.

SUMMARY

It is a general object to enable and/or improve packet forwarding in a wireless mesh network.

It is an object to provide a method of enabling packet forwarding in a wireless mesh network.

It is also an object to provide an arrangement configured to enable packet forwarding in a wireless mesh network.

Another object is to provide a network node in a wireless mesh network.

Yet another object is to provide a computer program for enabling, when executed, packet forwarding by a network node of a wireless mesh network.

Still another object is to provide a computer-program product comprising a computer-readable medium having stored thereon such a computer program.

It is also an object to provide an apparatus for enabling packet forwarding by a network node of a wireless mesh network.

Another object is to provide a network device comprising such an arrangement.

These and other objects are met by embodiments of the proposed technology.

According to a first aspect, there is provided a method of enabling packet forwarding in a wireless mesh network comprising a plurality of nodes. The method comprises:

conforming, for transmission of the same network layer information from at least two different nodes, the corresponding over-the-air packets to be node-independent; and scheduling the conformed over-the-air packets for synchronized and simultaneous transmission from the at least two different nodes.

The proposed technology enables concurrent forwarding of packets that are identical over the air from at least two different nodes in a wireless mesh network, making the transmissions combine constructively at the receiver(s) and hence reducing the risk of decoding errors.

Moreover, the solution reduces the contention on the medium, thus reducing the risk of packet collisions. As a result, packet delays in the mesh network are typically reduced, the capacity of the network increased, and the coverage extended.

According to a second aspect, there is provided an arrangement configured to enable packet forwarding in a wireless mesh network comprising a plurality of nodes. The arrangement is adapted to configure, for transmission of the same network layer information from at least two different nodes, said at least two different nodes with the same link layer address so that packets comprising the same network layer information are identical over the air. The arrangement is also adapted to schedule the packets for synchronized and simultaneous transmission over the air from the at least two different nodes.

According to a third aspect, there is provided a network node in a wireless mesh network. The network node is adapted to configure, for transmission of a packet comprising the same network layer information as a corresponding packet of at least one other network node in the wireless mesh network, the packet with a link layer address that will be the same as a link layer address used by the at least one other network node for the corresponding packet. The network node is adapted to schedule transmission of the packet over the air synchronized and simultaneous with transmission of the corresponding packet comprising the same network layer information from the at least one other network node.

According to a fourth aspect, there is provided a computer program for enabling, when executed, packet forwarding by a network node of a wireless mesh network. The computer program comprises instructions, which when executed by at least one processor, cause the at least one processor to:

configure, for transmission of a packet comprising the same network layer information as a corresponding packet at least one other network node in the wireless mesh network, the packet with same link layer address as used by the at least one other network node, schedule transmission of the packet over the air synchronized and simultaneous with transmission of the corresponding packet comprising the same network layer information from the at least one other network node.

According to a fifth aspect, there is provided a computer-program product comprising a computer-readable medium having stored thereon such a computer program.

According to a sixth aspect, there is provided an apparatus for enabling packet forwarding by a network node of a wireless mesh network. The apparatus comprises:

an address configuration module for configuring, for transmission of a packet comprising the same network layer information as a corresponding packet at least one other network node in the wireless mesh network, the packet with same link layer address as used by the at least one other network node, and a scheduling module for scheduling transmission of the packet over the air synchronized and simultaneous with transmission of the corresponding packet comprising the same network layer information from the at least one other network node.

According to a seventh aspect there is provided a network device comprising an arrangement of the second aspect.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

As used herein, the non-limiting terms "network node" and "node" may refer to any node or communication unit of a wireless mesh network that is capable of wireless communication with at least one other node.

For a better understanding of the proposed technology, it may be useful to begin with a brief system overview and/or analysis of the technical problem.

One way to improve performance when transmitting the same packet from multiple nodes is to make use of concurrent transmissions. If the packets transmitted from the different nodes are identical (over the air) concurrent transmissions combine constructively rather than destructively at the receiver(s).

Figure 1:
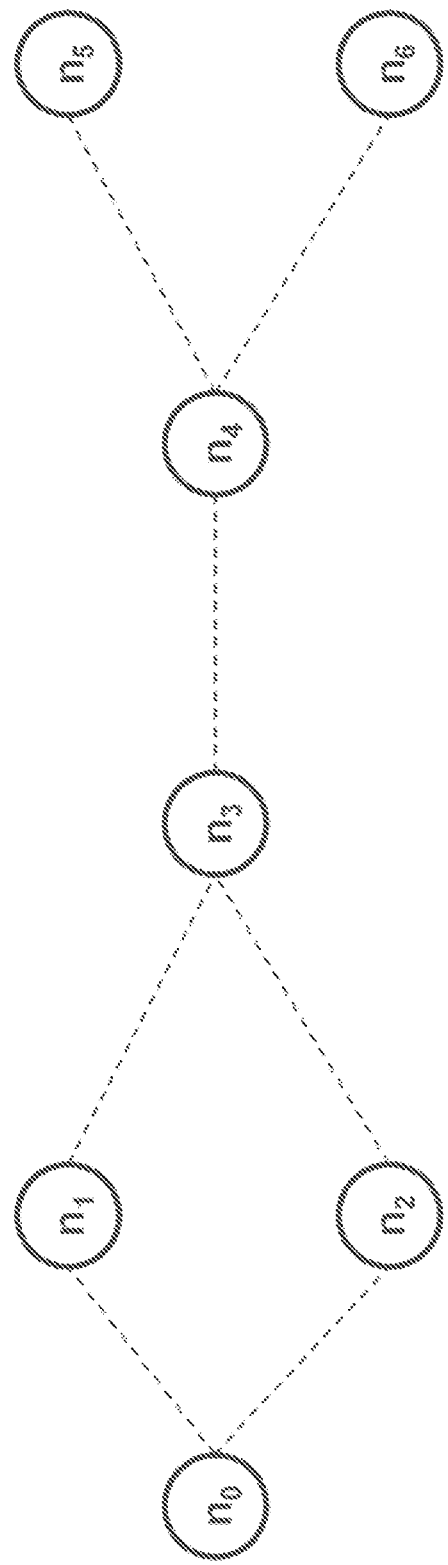
FIG. 1 is a schematic diagram illustrating an example of a wireless mesh network.
Figure 2:
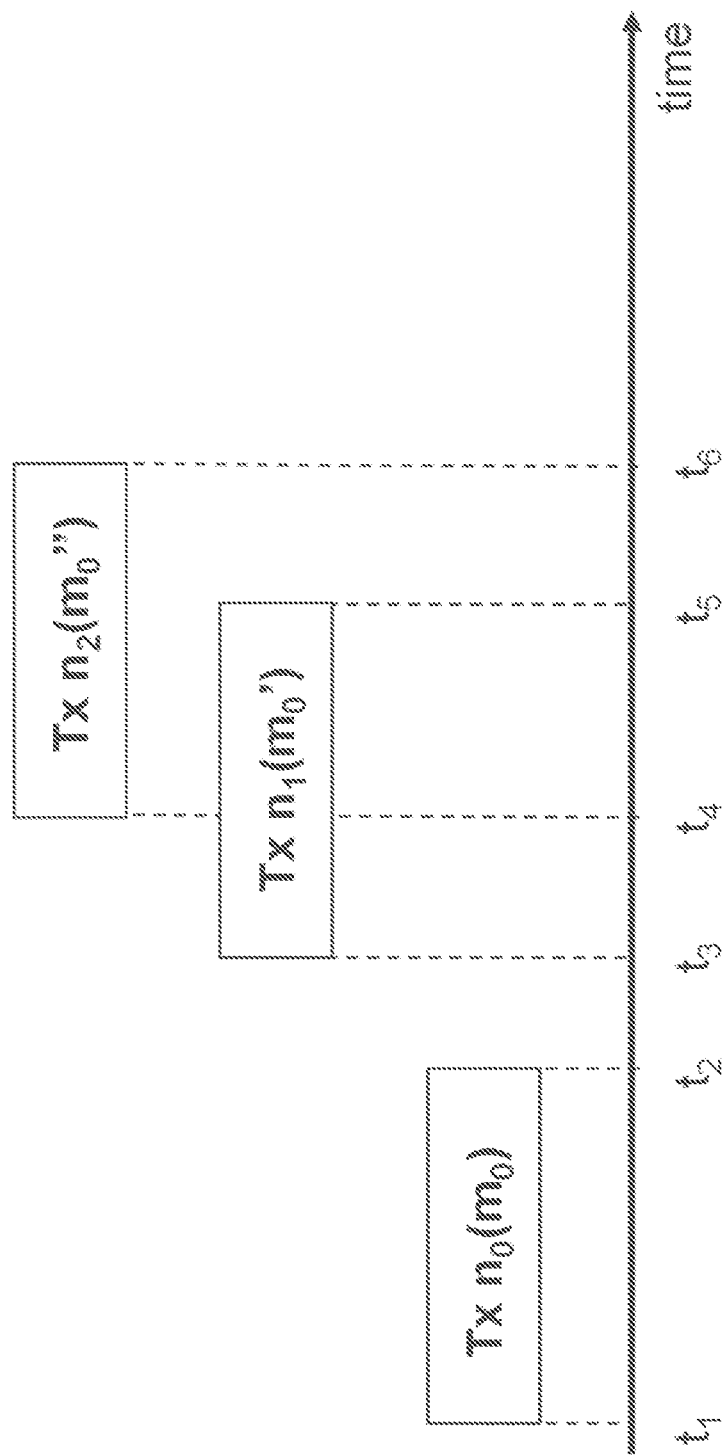
FIG. 2 is a schematic diagram illustrating normal uncoordinated transmission in a wireless mesh network.
Figure 3:
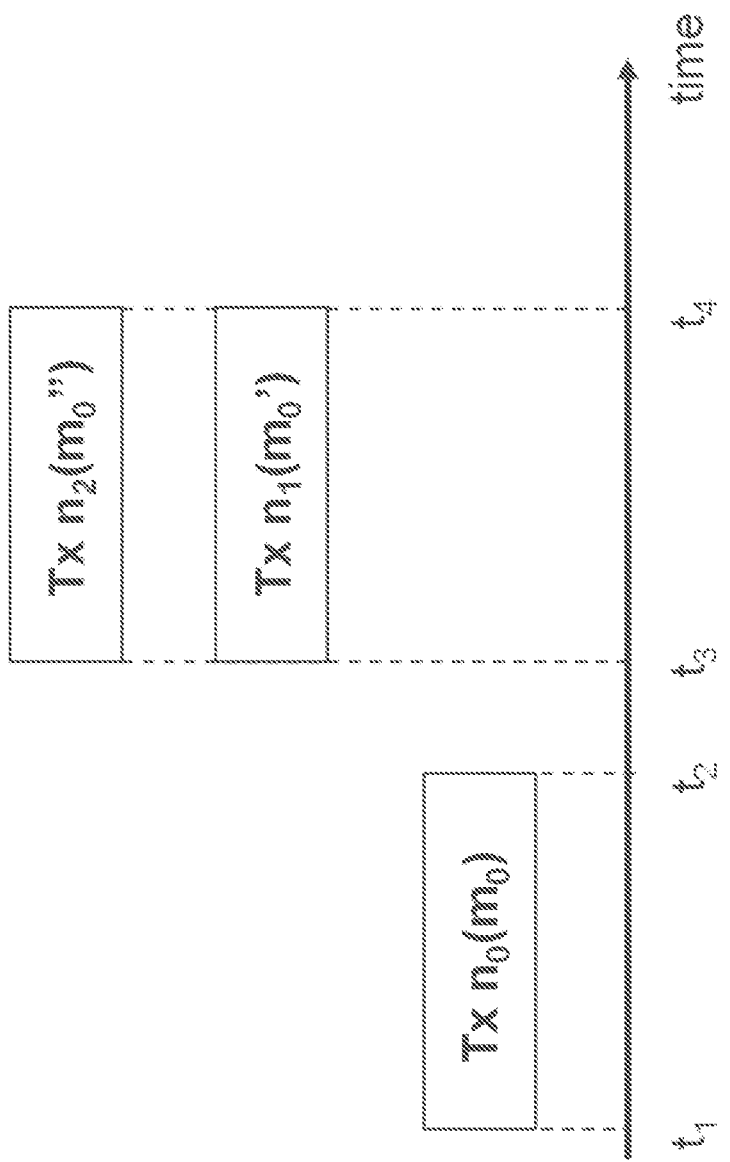
FIG. 3 is a schematic diagram illustrating an example of concurrent transmission in a wireless mesh network.

Such concurrent transmission does not only make packet transmissions combine constructively at the receiver, it also limits the collision risk with other packets as a packet forwarded from multiple nodes are aligned rather than dispersed in time and hence occupy less time over the air. An example is depicted in FIG. 3. In this particular example, the time-on-air for the packet forwarding is $t_4$-$t_3$, corresponding to the time it takes to transmit a single copy of the packet over the air, which is lower compared to the corresponding time $t_6$-$t_3$ in FIG. 2 where packet forwarding is uncoordinated.

By way of example, in some wireless mesh networks such as BLE mesh networks flooding over a common set of channels is used to send packets from the source to the destination. Flooding results in serious medium contention at higher traffic intensities. Aligning transmission by means of concurrent transmission would be a way to reduce the contention on the medium and also improve the Signal-to-Interference-and-Noise Ratio (SINR) at the receiver(s). However, it is currently not generally possible to make use of concurrent packet forwarding in wireless mesh networks such as BLE mesh networks.

The inventors have realized that a packet forwarded by one node looks different over the air compared to the same packet forwarded by another node. One of the reasons behind this is that different nodes use different advertising (Medium Access Control; MAC) addresses, which makes the advertising PDU payload different even when different nodes forward identical higher layer packets. This, furthermore, results in a different CRC and both these matters cause the transmission to appear differently over the air.

Further, there is currently no mechanism available to synchronize packet forwarding across nodes. Especially, there is no mechanism available to synchronize packet forwarding in a heterogeneous sensor node platform comprising nodes of different types.

Figure 4:
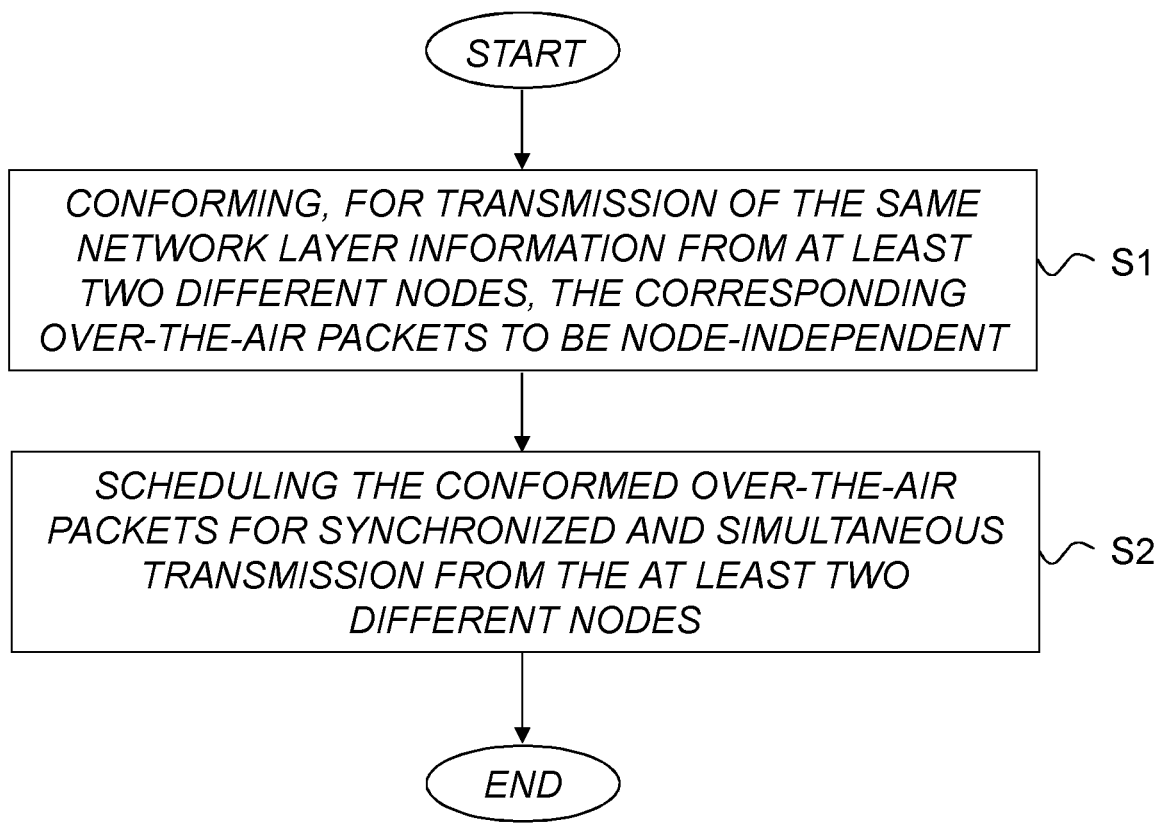
FIG. 4 is a schematic flow diagram illustrating an example of a method of enabling packet forwarding in a wireless mesh network according to an embodiment of the proposed technology.

FIG. 4 is a schematic flow diagram illustrating an example of a method of enabling packet forwarding in a wireless mesh network according to an embodiment of the proposed technology. The wireless mesh network generally comprises a plurality of nodes.

Basically, the Method Comprises:

S1: conforming, for transmission of the same network layer information from at least two different nodes, the corresponding over-the-air packets to be node-independent; and S2: scheduling the conformed over-the-air packets for synchronized and simultaneous transmission from the at least two different nodes.

The proposed technology thus enables concurrent forwarding of packets that are identical over the air from at least two different nodes in a wireless mesh network, making the transmissions combine constructively at the receiver(s) and hence reducing the risk of decoding errors.

Moreover, the solution reduces the contention on the medium, thus reducing the risk of packet collisions. As a result, packet delays in the mesh network are typically reduced, the capacity of the network increased, and the coverage extended.

Figure 5:
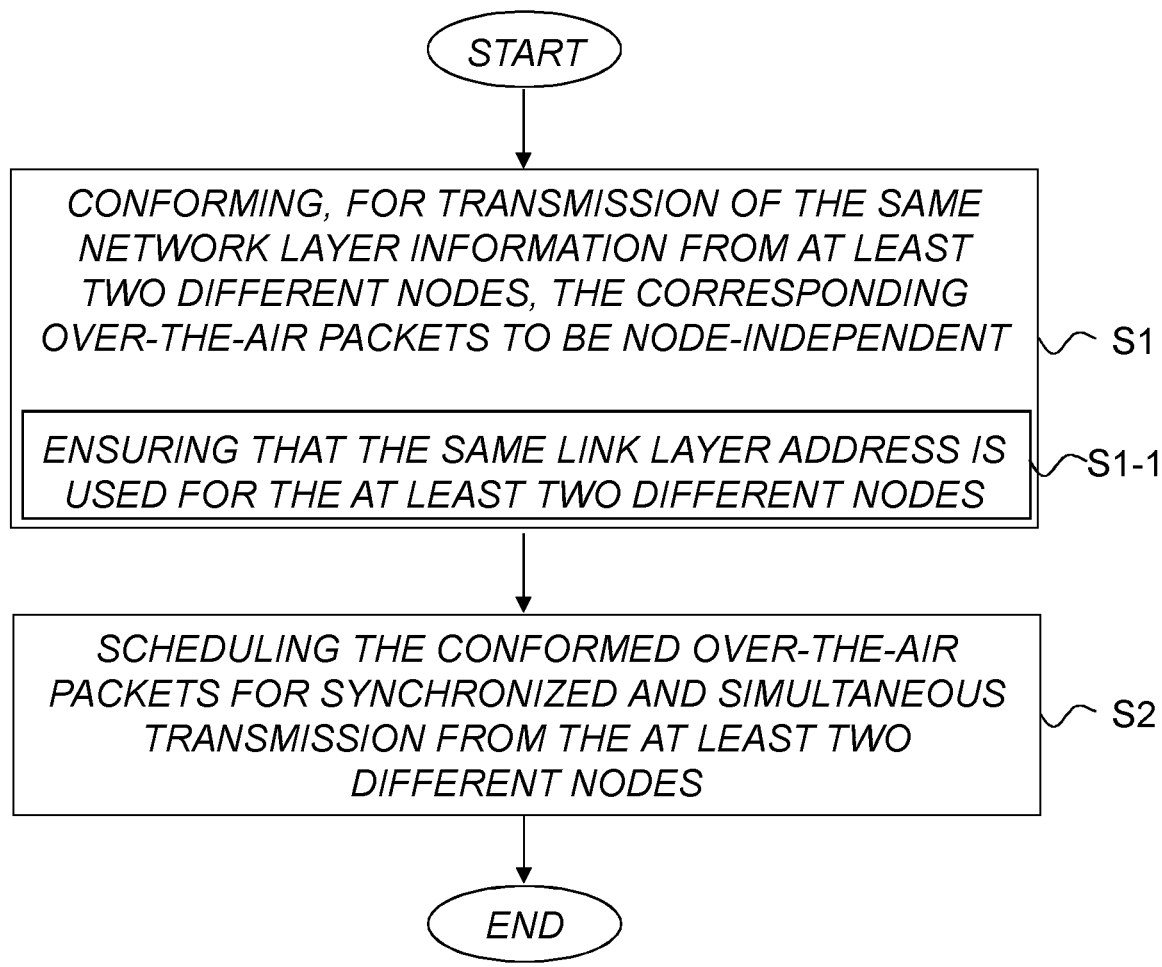
FIG. 5 is a schematic flow diagram illustrating another example of a method according to a particular embodiment.

By way of example, each node has a link layer address and as illustrated in the schematic diagram of FIG. 5 the step S1 of conforming the corresponding over-the-air packets includes ensuring S1-1 that the same link layer address is used for the at least two different nodes.

Figure 6:
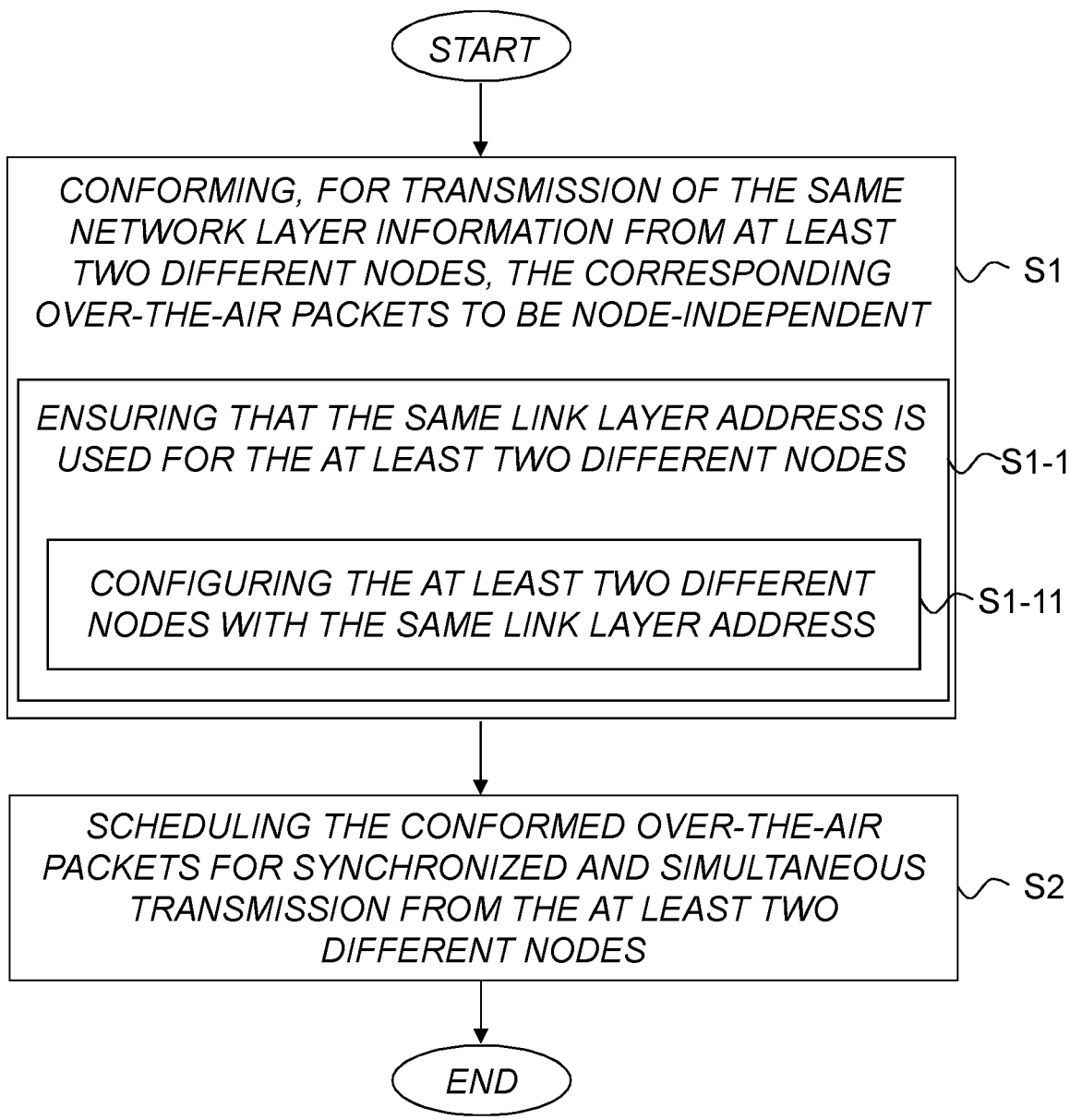
FIG. 6 is a schematic flow diagram illustrating yet another example of a method according to a particular embodiment.

In the particular example of FIG. 6, the step S1-1 of ensuring that the same link layer address is used for the at least two different nodes includes configuring S1-11 the at least two different nodes with the same link layer address so that the packets comprising the same network layer information are identical over the air.

Concurrent transmissions has been discussed for mesh networks, e.g. in reference [1] that present the Glossy algorithm. Using Glossy, received packets are immediately forwarded to facilitate rapid flooding (in 802.15.4-based networks). Glossy is proposed as a scheme for a network in which flooding is temporally decoupled from data collection and the radio driven execution model uses that fact that packets are forwarded immediately (as soon as practically possible) after reception. The feasibility of Glossy is demonstrated using a common sensor node platform, i.e., in a network where all nodes are identical in terms of hardware and software, which implies that immediate packet forwarding results in packet transmission happening at virtually the same time at all nodes. The description of the Glossy algorithm does not discuss the importance of all forwarded packets being identical.

As an example, the link layer address may be a static address or a private non-resolvable address.

In a particular example, each of the nodes may determine the link layer device address pseudo-randomly using a seed derived from the network layer information.

For example, a pseudo-random algorithm and/or at least one input parameter for pseudo-randomly determining the link layer device address may be received by the at least two different nodes from a provisioning node.

Alternatively, the link layer address may be received by the at least two different nodes from a provisioning node.

According to a particular example, the at least two different nodes receive the same packet comprising the same network layer information.

In an example embodiment, the step S2 of scheduling the conformed over-the-air packets comprises scheduling packet forwarding to a fixed time after receiving the same packet.

Alternatively, the step S2 of scheduling the conformed over-the-air packets comprises scheduling packet forwarding to a pseudo-randomly determined time after receiving the same packet.

By way of example, the same network layer information comprises the same network layer protocol data unit.

In a particular embodiment, the packet forwarding is based on flooding and/or the wireless mesh network is a Bluetooth Low Energy, BLE, network.

In other words, the proposed technology may be seen as a mechanism for address configuration and transmission scheduling.

In the following, the proposed technology will be described with reference to a number of illustrative and non-limiting examples.

According to a particular embodiment, a so-called random device address may be used when forwarding packets in a wireless mesh network such as a BLE mesh network. The random device address can be a static device address or a private non-resolvable device address. In both cases, the device address is typically configured so that it results in the same device address and link layer header for identical higher layer (network layer) PDUs independent of the node. In a preferred embodiment, a private non-resolvable device address is used, e.g. pseudo-randomly derived using an agreed random number generator algorithm (RNG), which state (seed) is determined from the higher layer (network layer) PDU.

Similarly, the packet forwarding may be scheduled at a time common to all nodes transmitting the same higher layer (network layer) PDU. In an example embodiment the packet forwarding is scheduled at a fixed time after the reception of the packet from the neighbour node. In another embodiment, the packet forwarding is scheduled at a pseudo-randomly generated time using an agreed RNG algorithm, which state (seed) is determined from the higher layer (network layer) PDU.

In this way, the proposed technology may facilitate concurrent forwarding of packets from multiple nodes in a wireless mesh network such as a BLE mesh networks, making the transmissions combine constructively at the receiver(s) and hence reducing the risk of decoding errors. Moreover, the solution reduces the contention on the medium, reducing the risk of packet collisions. As a result, packet delays in the mesh network are reduced, the capacity of the network increased, and the coverage extended.

In a particular example, the proposal facilitates concurrent transmission in wireless mesh networks such as BLE mesh networks by:

synchronizing in time the packet transmissions such that dissimilar nodes forward the same packet simultaneously, and assembling the over-the-air packet independently of the node identity such that packets transmitted by different nodes look identical over the air when it is the same packet that is forwarded.

In a sense, a basic idea is thus to configure device addresses in a mesh network so that packets containing the same higher layer (network layer) information are identical over the air. These packets are typically scheduled for simultaneous transmission in order to obtain the positive effects of constructive interference.

Examples of Transmission Synchronization

Given that the over the air packet will be constructed in such a way that it is independent of the transmitting node, the packet transmission scheduling may be coordinated across nodes that forward the same packet.

An example method is based on the agreement that packet forwarding should be executed at a pre-determined time after the reception of the packet that should be forwarded.

A second option is to define the forwarding time in a pseudo-random fashion, but deterministically given by the packet that should be forwarded. One could, e.g., apply a random number generator (RNG) and use the link layer payload, in full or in part, as input to the RNG. The random number can be generated dependent or independent of the TTL. As the skilled person understands, there are several RNG implementations available off the shelf. A node that should forward a packet may have other obligations that come in conflict with the derived transmission time. If that is the case, the node may simply decide to forward the packet at some other time and the node then falls back to the default behavior without concurrent transmission. As the node is aware of when other nodes potentially may forward the packet, it should then preferably select the alternative transmission time such that destructive interference is avoided, i.e., avoid overlapping transmissions.

Figure 7:
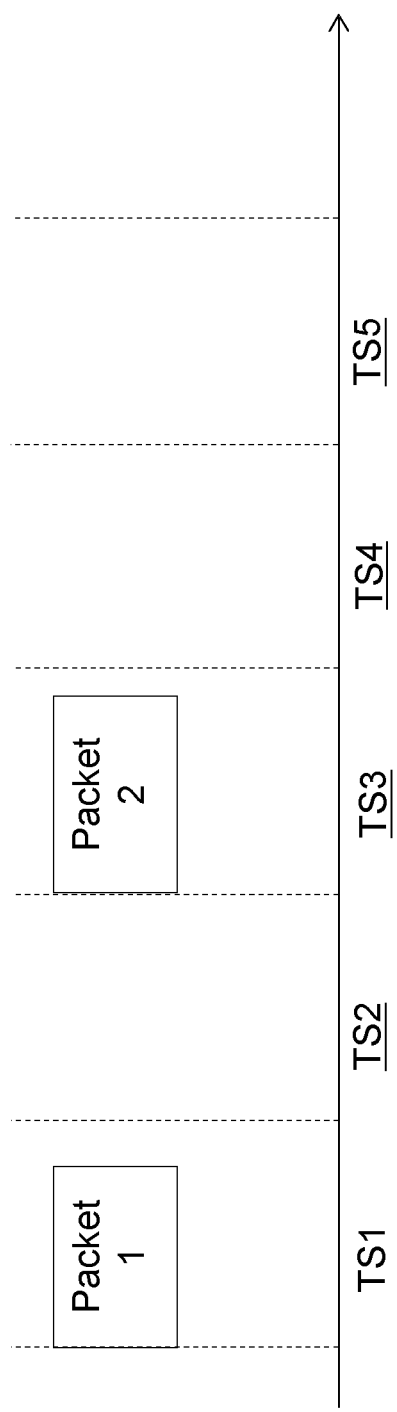
FIG. 7 is a schematic diagram illustrating selection of a transmission time slot from a list of time slots.

A third option is to choose pseudo-randomly a time slot from a predefined list, when the packet will be forwarded. A list of such time slots may be defined, e.g. by the transmission window (maximum time when packet transmission should be finished) and the length of a slot. The length or duration of a slot can be chosen as duration of the longest possible packet or as the typical duration of packets in the network plus a selectable margin. Reference can be made to FIG. 7.

In all three options above, the packet forwarding time could be set in a limited range [t, T]. The value of t, which is the minimum packet forwarding delay, could be selected considering that packet processing at different node types may take different amount of time, and the time t should hence typically accommodate for all node types to finalize packet processing before the minimum packet forwarding delay has expired As an example, t=1 ms. The maximum packet forwarding delay, T, can be determined, e.g. based on the clock accuracy of the radio chips and the drift tolerance at the receiver.

In general, the usage of concurrent transmission may place relatively strict demands on node synchronization and it may be important that the physical layer, and the employed receiver, can handle some time dispersion. Even when a packet is transmitted by a single node, however, scattering objects in the local environment may cause receivers to receive multiple, time-delayed copies of the same signal/packet. With concurrent transmission, this is deliberately constructed and it is important that the nodes are able to synchronize their transmissions with sufficiently high accuracy. The skilled person knows how to realize such synchronization depending on the selected implementation and application.

As an example, a rudimentary feasibility analysis can be obtained for Bluetooth by considering that the standard specifies a clock accuracy of 20 ppm in active mode. The worst clock drift between any two devices is then 40 ppm. Assuming a drift tolerance of 0.2 us (over a symbol period of 1 us), the maximum packet forwarding delay may be selected as T=5 ms.

Examples of Packet Assembly

Figure 8:
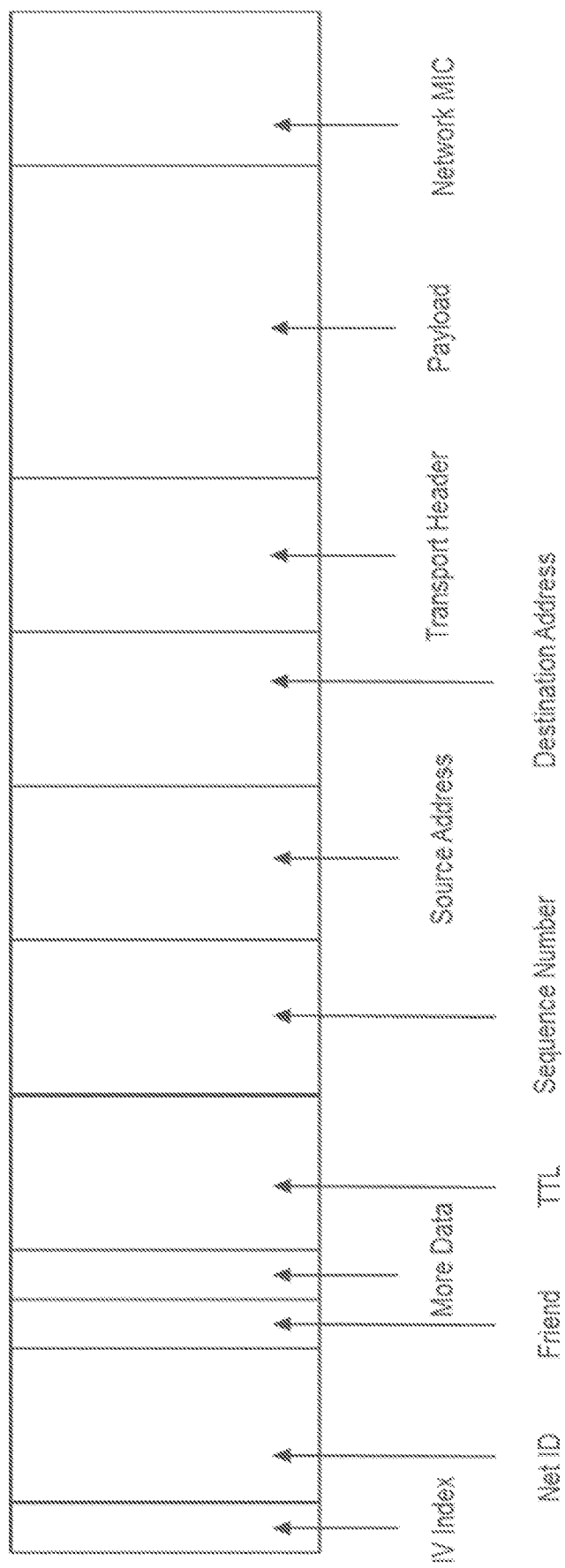
FIG. 8 is a schematic diagram illustrating an example of a BLE mesh network layer packet format including all of its fields.

FIG. 8 is a schematic diagram illustrating an example of a BLE mesh network layer packet format including all of its fields. A node that forwards a packet will decrement the TTL by one, which changes the part of the packet that is being obfuscated. Moreover, as the encryption of the encrypted part of the packet depends on the TTL—the TTL is part of the nonce that is an input to the used encryption algorithm—also the encrypted block will be altered when the TTL changes. All these, however, are independent of the node that performs the operation, meaning that on the network layer different nodes that forward the same packet, with the same TTL value, will be transmitting identical packets over the air.

Figure 9:
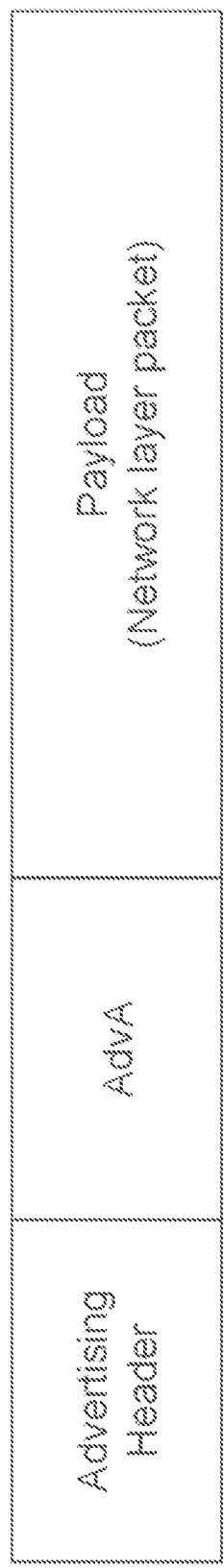
FIG. 9 and FIG. 10 are schematic diagrams illustrating an example of the BLE link layer and physical layer packet formats, respectively.
Figure 10:
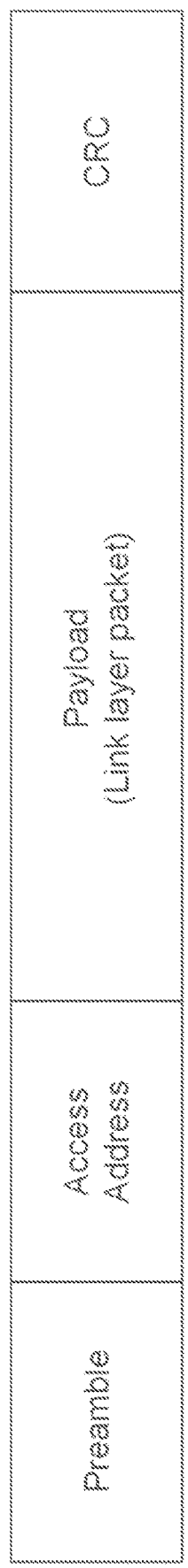

FIG. 9 and FIG. 10 are schematic diagrams illustrating an example of the BLE link layer and physical layer packet formats, respectively. The link layer packet takes the network layer packet as payload, and includes an advertising address (AdvA), also referred to as advertiser's device address, and a header. The header will be identical for all mesh packets whereas the advertising address, in the typical case, is node specific in the currently conventional mechanism. On the physical layer a CRC is added, calculated over the physical layer payload, i.e., the link layer PDU. Also, an access address and a preamble are added. Here, using the conventional mechanism, as the CRC calculation depends on the advertising address field (in the link layer packet), different nodes forwarding the same packet will be using different CRCs. The access address is fixed for all packets transmitted over the advertisement channels and also the preamble is predetermined.

The inventors have realized that to make the transmissions of different nodes that forward the same packet look identical over the air one hence must make sure that the same advertising address is employed. This will make the link layer packet identical, and hence also the physical layer packets as the CRC calculation is deterministically calculated over the link layer packet. By way of example, a random device address (advertising address) can be used for mesh packets, e.g. in the form of a static device address or a private non-resolvable device address.

Figure 13:
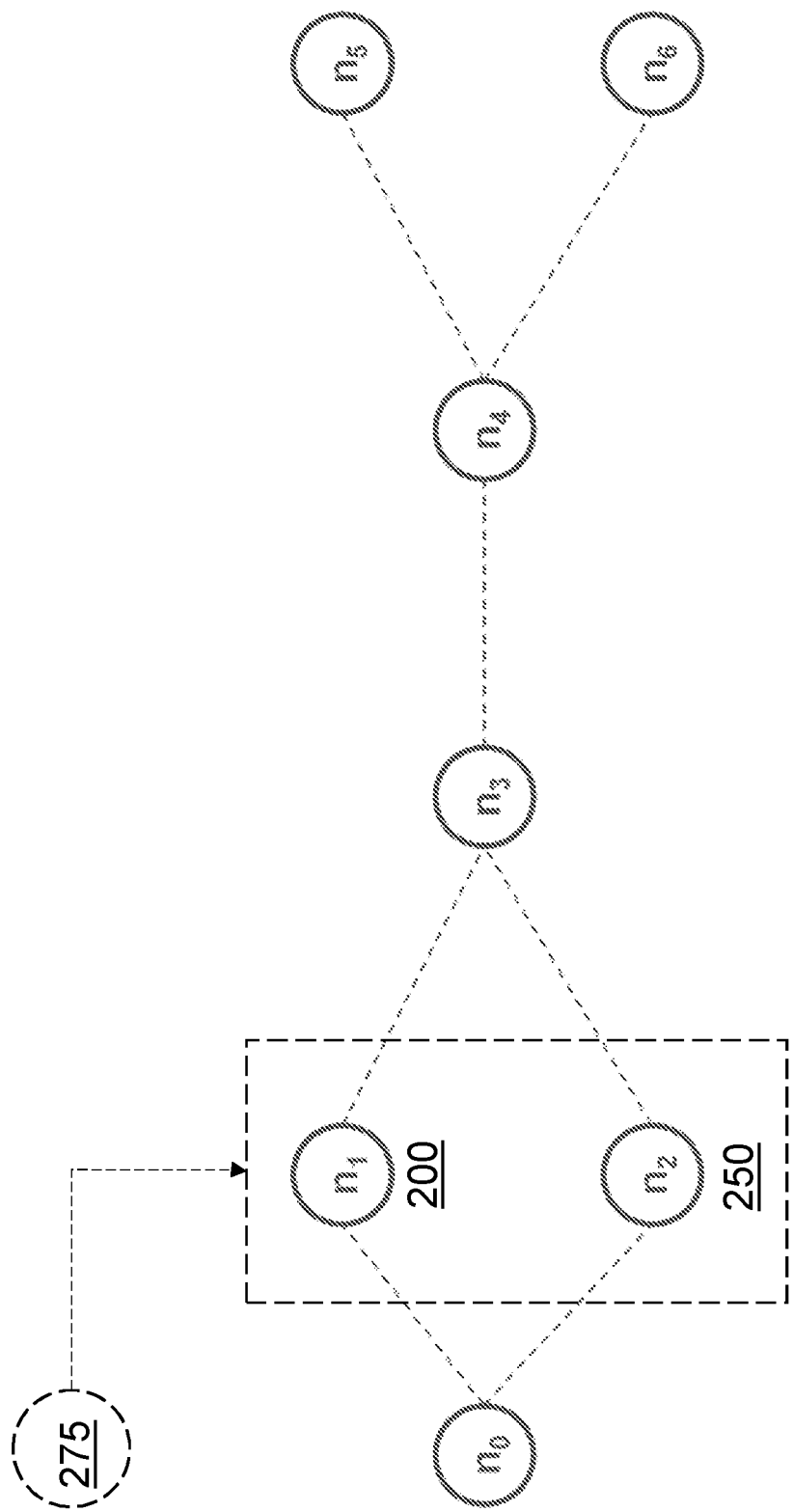
FIG. 13 is a schematic diagram illustrating an example of a wireless mesh network in which at least two nodes concurrently transmit the same packet according to the principles described herein.

If a static device address is used this may be determined by a provisioning node 275 and distributed to the relevant nodes 200, 250 upon provisioning, as schematically illustrated in FIG. 13. A more favorable approach, however, may be to use a private non-resolvable device address. In such a case the device address may be determined in a pseudo-random fashion on a packet-by packet basis. For example, the 48-bit address can be derived using a predefined RNG taking the link layer payload (i.e., the network layer packet), in full or in part, as input to the RNG. The device address can be made dependent or independent of the TTL.

The proposed technology may also be implemented when using other advertisement PDUs, as long as the additional fields in the link layer header and the parameters related to the transmission of packets are identical for packets containing the same higher layer (network layer) PDUs. Examples include PDUs that can be transmitted over different (link layer) channels, at variable time instants, and using different physical layer transmission parameters (such as modulation and channel coding). In such cases, these variables should be coordinated across the involved nodes. Messages that are transmitted using multiple packets over the air can be handled similarly.

Figure 11:
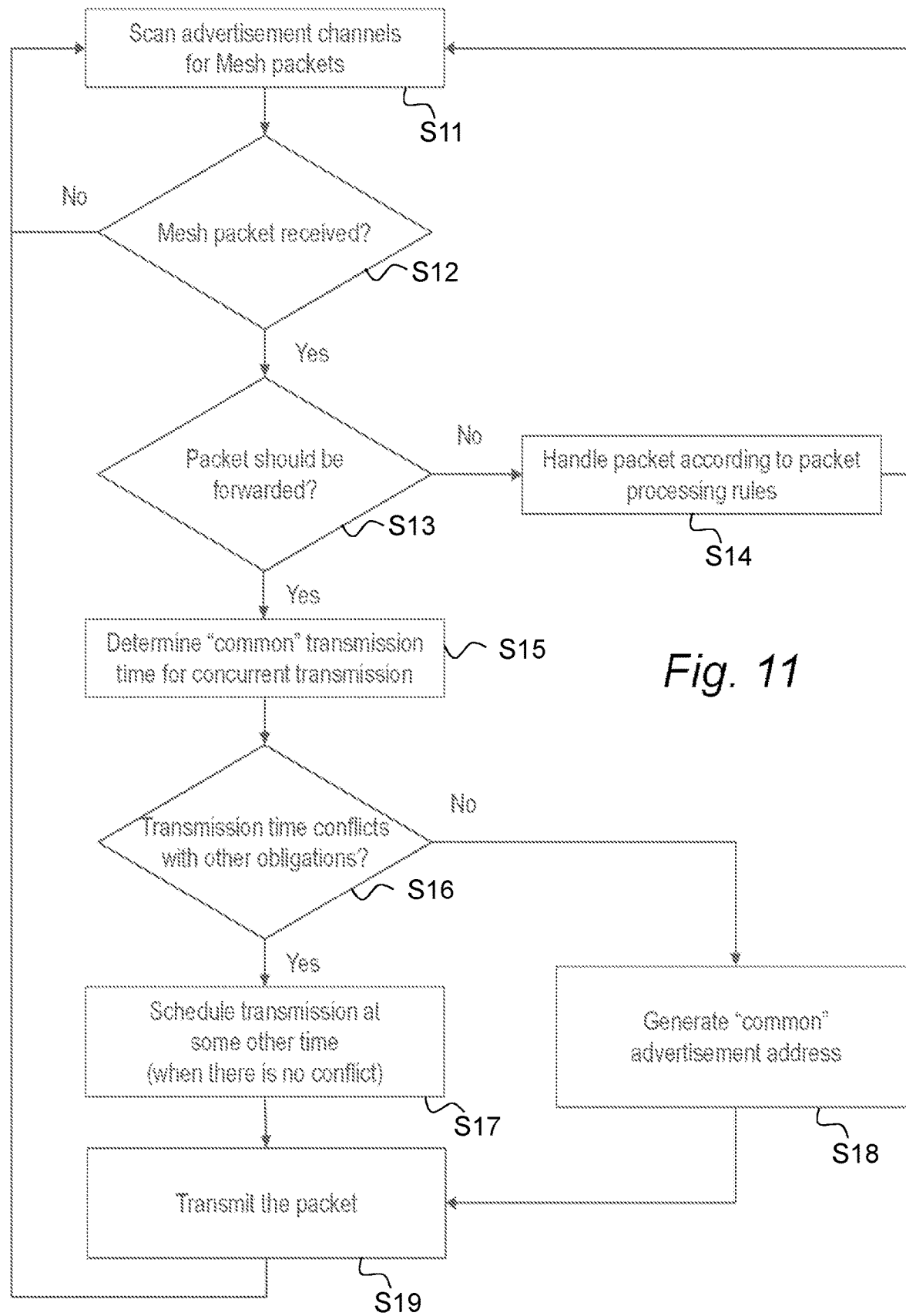
FIG. 11 is a schematic flow diagram illustrating an example of an overall procedure of a wireless mesh node.

FIG. 11 is a schematic flow diagram illustrating an example of an overall procedure of a wireless mesh node. The node such as a BLE mesh relay scans the advertisement channels for mesh packets in step S11. It is investigated whether a mesh packet is received in step S12. If no, the node continues to scan the advertisement channels. If yes, it is investigated whether the packet should be forwarded in step S13. If no, the packet is handled according to normal packet processing rules in step S14, and the node continues to scan the advertisement channels. If yes, a common transmission time for concurrent transmission is determined in step S15. Next, it is investigated whether the transmission time conflicts with other obligations in step S16. If yes, the transmission is scheduled at another time when there is no conflict in step S17. If no, a common advertisement address is generated in step S18. The packet is transmitted at the determined transmission time in step S19. The node continues to scan the advertisement channels in step S11.

Assuming two or more nodes in the mesh network operate according to such a procedure, using the same or similar principles for obtaining or determining the common transmission time and the common advertisement address, concurrent transmission of identical packets over the air may be ensured when the same network layer information is to be forwarded.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided an arrangement configured to enable packet forwarding in a wireless mesh network comprising a plurality of nodes. The arrangement is adapted to configure, for transmission of the same network layer information from at least two different nodes, said at least two different nodes with the same link layer address so that packets comprising the same network layer information are identical over the air. The arrangement is also adapted to schedule the packets for synchronized and simultaneous transmission over the air from the at least two different nodes.

Figure 12:
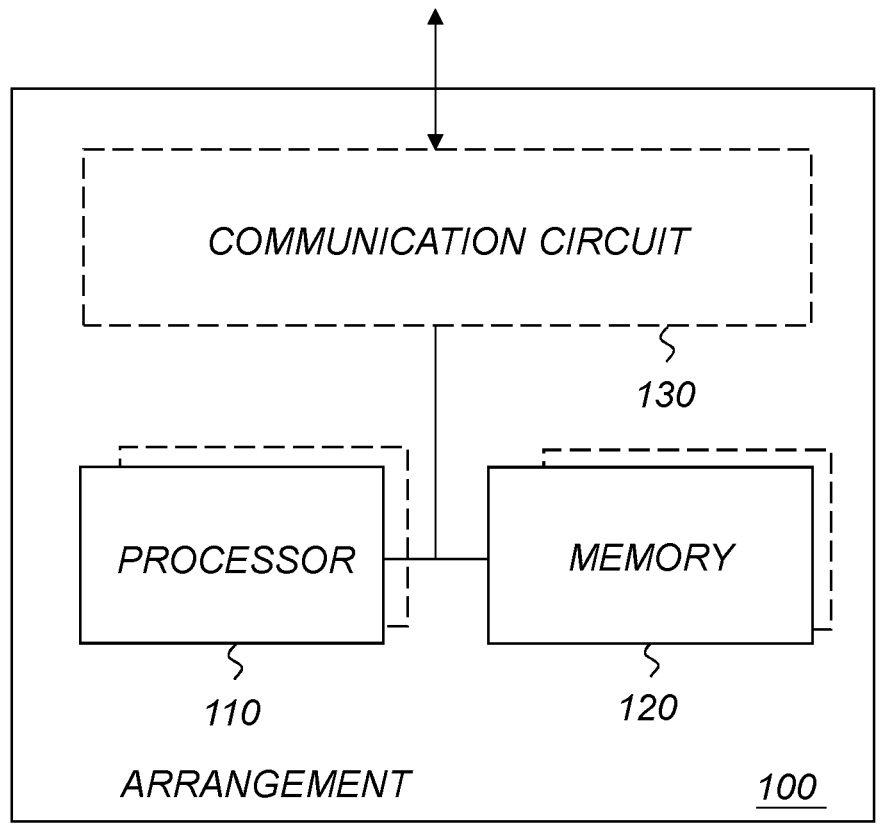
FIG. 12 is a schematic block diagram illustrating an example of an arrangement, based on a processor-memory implementation according to an embodiment.

FIG. 12 is a schematic block diagram illustrating an example of an arrangement 100, based on a processor-memory implementation according to an embodiment. In this particular example, the arrangement 100 comprises at least one processor 110 and memory 120, the memory 120 comprising instructions, which when executed by the at least one processor 110, cause the at least one processor 110 to enable the packet forwarding.

Alternatively, or as a complement, the arrangement may be based on a hardware circuitry implementation. Particular examples of suitable hardware circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM).

Optionally, the arrangement 100 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s).

It is also possible to provide a solution based on a combination of hardware and software. The actual hardware-software partitioning can be decided by a system designer based on a number of factors including processing speed, cost of implementation and other requirements.

FIG. 13 is a schematic diagram illustrating an example of a wireless mesh network in which at least two nodes 200, 250 concurrently transmit the same packet according to the principles described herein.

According to an aspect of the proposed technology, there is provided a network node in a wireless mesh network. The network node is adapted to configure, for transmission of a packet comprising the same network layer information as a corresponding packet of at least one other network node in the wireless mesh network, the packet with a link layer address that will be the same as a link layer address used by the at least one other network node for the corresponding packet. The network node is adapted to schedule transmission of the packet over the air synchronized and simultaneous with transmission of the corresponding packet comprising the same network layer information from the at least one other network node.

By way of example, the network node may be adapted to use a static address or a private non-resolvable address as the link layer address.

In a particular example, the network node is adapted to determine the link layer device address pseudo-randomly using a seed derived from the network layer information.

For example, a common pseudo-random algorithm and/or at least one input parameter for pseudo-randomly determining the link layer device address may be received from a provisioning node 275 (schematically illustrated in FIG. 13).

Alternatively, or as a complement, the network node may be adapted to receive the link layer address from the provisioning node 275.

As an example, the network node may be adapted to schedule packet transmission to a fixed time after receiving the packet.

For example, the network node may be adapted to schedule packet transmission to a pseudo-randomly determined time after receiving the packet.

Normally, but not limited thereto, the same network layer information comprises the same network layer protocol data unit.

Figure 14:
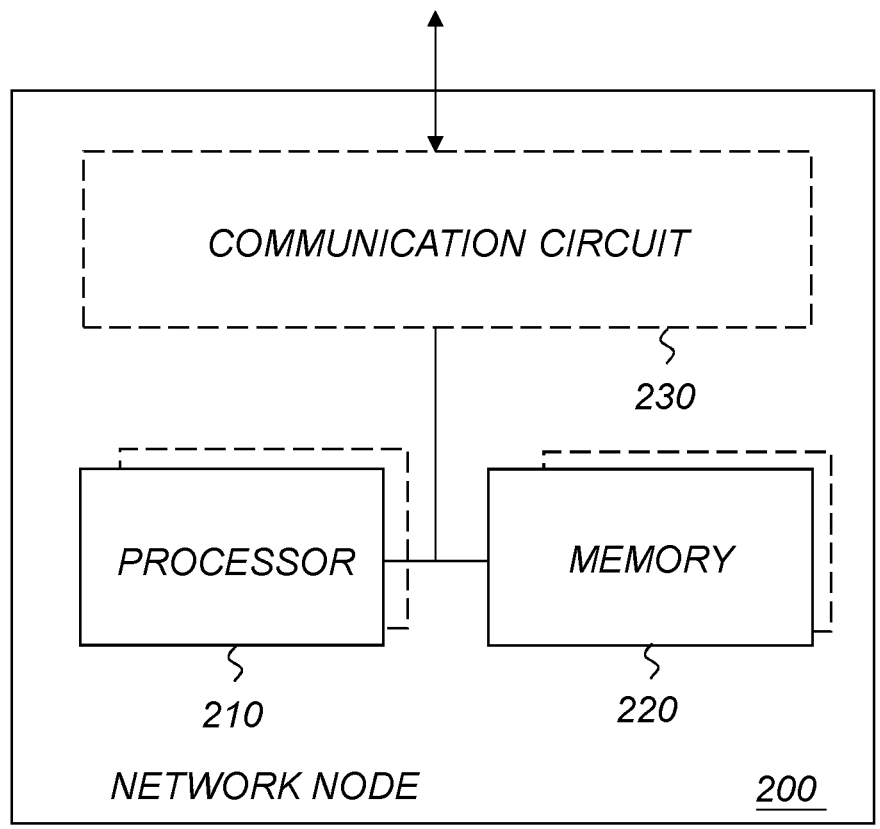
FIG. 14 is a schematic block diagram illustrating an example of a network node according to an embodiment.

FIG. 14 is a schematic block diagram illustrating an example of a network node according to an embodiment. The network node 200 comprises at least one processor 210 and memory 220, the memory 220 comprising instructions, which when executed by the at least one processor 210, cause the at least one processor 210 to configure the packet with same link layer address as the at least one other network node and to schedule transmission of the packet over the air.

Figure 15:
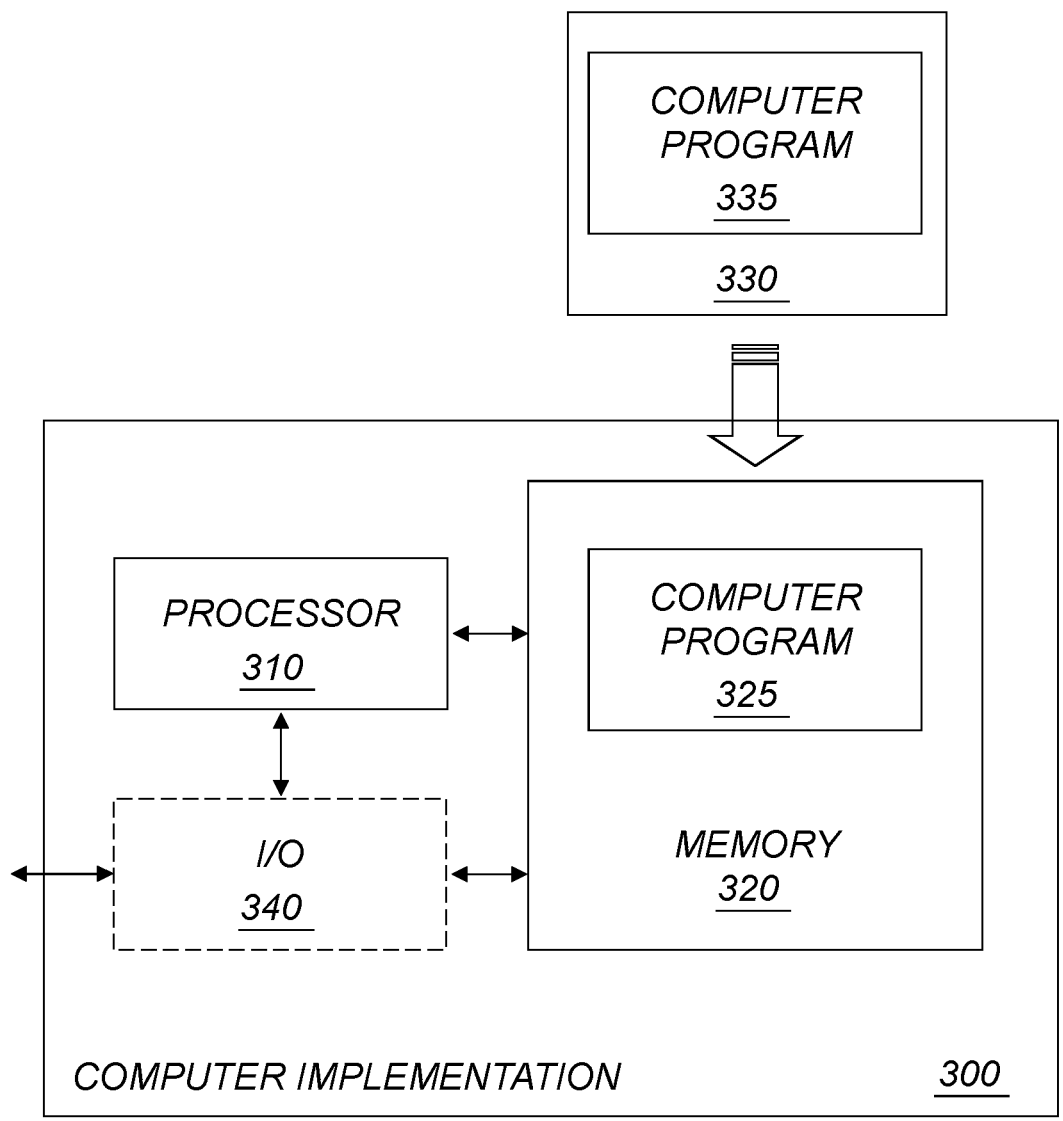
FIG. 15 is a schematic diagram illustrating an example of a computer-implementation 300 according to an embodiment.

FIG. 15 is a schematic diagram illustrating an example of a computer-implementation 300 according to an embodiment. In this particular example, at least some of the steps, functions, procedures, modules and/or blocks described herein are implemented in a computer program 325; 335, which is loaded into the memory 320 for execution by processing circuitry including one or more processors 310. The processor(s) 310 and memory 320 are interconnected to each other to enable normal software execution. An optional input/output device 340 may also be interconnected to the processor(s) 310 and/or the memory 320 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 310 is thus configured to perform, when executing the computer program 325, well-defined processing tasks such as those described herein.

The processing circuitry does not have to be dedicated to only execute the above-described steps, functions, procedure and/or blocks, but may also execute other tasks.

In a particular embodiment, the computer program 325; 335 is adapted for enabling, when executed, packet forwarding by a network node of a wireless mesh network. The computer program comprises instructions, which when executed by at least one processor 310, cause the processor(s) 310 to:

configure, for transmission of a packet comprising the same network layer information as a corresponding packet at least one other network node in the wireless mesh network, the packet with same link layer address as used by the at least one other network node, and schedule transmission of the packet over the air synchronized and simultaneous with transmission of the corresponding packet comprising the same network layer information from the at least one other network node.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 325; 335 may be realized as a computer program product, which is normally carried or stored on a computer-readable medium 320; 330, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Hence, there is provided a computer-program product comprising a computer-readable medium 320; 330 having stored thereon a computer program 325; 335.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 16:
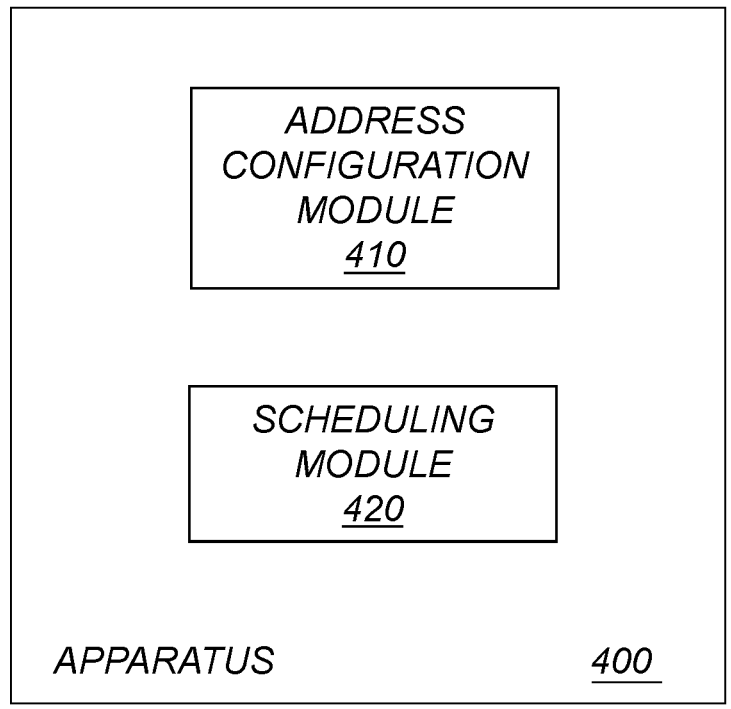
FIG. 16 is a schematic diagram illustrating an example of an apparatus for enabling packet forwarding by a network node of a wireless mesh network.

FIG. 16 is a schematic diagram illustrating an example of an apparatus for enabling packet forwarding by a network node of a wireless mesh network. The apparatus 400 comprises:

- an address configuration module 410 for configuring, for transmission of a packet comprising the same network layer information as a corresponding packet at least one other network node in the wireless mesh network, the packet with same link layer address as used by the at least one other network node, and
- a scheduling module 420 for scheduling transmission of the packet over the air synchronized and simultaneous with transmission of the corresponding packet comprising the same network layer information from the at least one other network node.

Alternatively it is possible to realize the module(s) in FIG. 16 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The proposed technology may also be implemented in any suitable network device in the wireless communication system, or a network device in connection with the wireless communication system. By way of example, the network device may be a suitable network node such a mesh node or mesh relay. However, the network device or suitable parts thereof may alternatively be a cloud-implemented network device.

Figure 17:
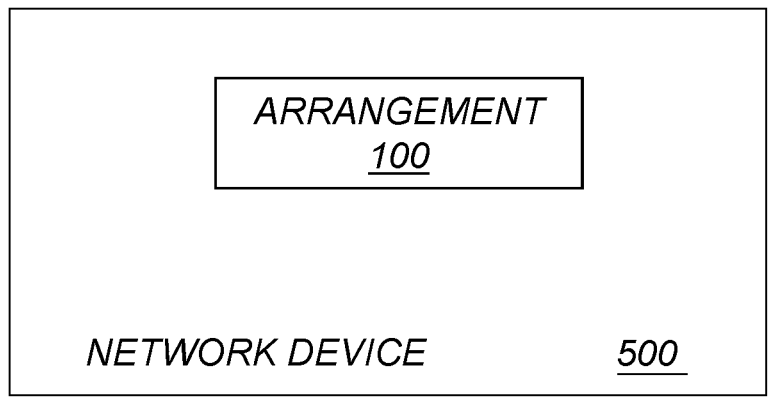
FIG. 17 is a schematic diagram illustrating an example of a network device 500 comprising an arrangement 100 as described herein.

FIG. 17 is a schematic diagram illustrating an example of a network device 500 comprising an arrangement 100 as described herein.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

- Consolidation of network functionality into virtualized software running on customized or generic hardware. This is sometimes referred to as network function virtualization.
- Co-location of one or more application stacks, including operating system, running on separate hardware onto a single hardware platform. This is sometimes referred to as system virtualization, or platform virtualization.
- Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A network device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] F. Ferrari et al, "Efficient network flooding and time synchronization with Glossy", in $10^{th}$ international Conference on Information Processing in Sensor Networks (IPSN), 2011.

The invention claimed is:

1. A method of enabling packet forwarding in a wireless mesh network comprising a plurality of nodes, wherein the method comprises:
    conforming, for transmission of same network layer information from at least two different nodes, corresponding over-the-air packets to be node-independent,
        wherein each node has a link layer address,
        wherein conforming the corresponding over-the-air packets includes ensuring that the same link layer address is used for the at least two different nodes, and
        wherein each of the nodes determines the link layer address pseudo-randomly using a seed derived from the network layer information; and
    scheduling the conformed over-the-air packets for synchronized and simultaneous transmission from the at least two different nodes.

2. The method of claim 1, wherein ensuring that the same link layer address is used for the at least two different nodes includes configuring the at least two different nodes with the same link layer address so that the packets comprising the same network layer information are identical over the air.

3. The method of claim 1, wherein the link layer address is a static address or a private non-resolvable address.

4. The method of claim 1, wherein a pseudo-random algorithm and/or at least one input parameter for pseudo-randomly determining the link layer address is received by said at least two different nodes from a provisioning node.

5. The method of claim 1, wherein the link layer address is received by said at least two different nodes from a provisioning node.

6. The method of claim 1, wherein the at least two different nodes receive the same packet comprising the same network layer information.

7. The method of claim 6, wherein scheduling the conformed over the-air packets comprises scheduling packet forwarding to a fixed time after receiving the same packet.

8. The method of claim 6, wherein scheduling the conformed over the-air packets comprises scheduling packet forwarding to a pseudo-randomly determined time after receiving the same packet.

9. The method of claim 1, wherein the same network layer information comprises the same network layer protocol data unit.

10. The method of claim 1, wherein the packet forwarding is based on flooding.

11. The method of claim 1, wherein the wireless mesh network is a Bluetooth Low Energy, BLE, network.

12. A network node in a wireless mesh network,
wherein the network node is adapted to configure, for
transmission of a packet comprising the same network
layer information as a corresponding packet of at least
one other network node in the wireless mesh network,
the packet with a link layer address that will be the
same as a link layer address used by the at least one
other network node for the corresponding packet,
wherein the network node is adapted to determine the
link layer address pseudo-randomly using a seed
derived from the network layer information and
wherein the network node is adapted to schedule transmission of the packet over the air synchronized and
simultaneous with transmission of the corresponding
packet comprising the same network layer information
from the at least one other network node.

13. The network node of claim 12, wherein the network node is adapted to use a static address or a private non-resolvable address as the link layer address.

14. The network node of claim 12, wherein a common pseudo-random algorithm and/or at least one input parameter for pseudo-randomly determining the link layer address is received from a provisioning node.

* * * * *